(12) United States Patent
Major et al.

(10) Patent No.: US 6,941,043 B1
(45) Date of Patent: Sep. 6, 2005

(54) WAVELENGTH STABILIZATION OF AN EXTERNAL CAVITY LASER DIODE (ECLD)

(75) Inventors: John Cameron Major, San Jose, CA (US); Frans Kusnadi, San Jose, CA (US); Vladimir Kupershmidt, Pleasanton, CA (US)

(73) Assignee: K2 Optronics, Inc., Sunnyvale, CA (US)

( * ) Notice: Subject to any disclaimer, the term of this patent is extended or adjusted under 35 U.S.C. 154(b) by 286 days.

(21) Appl. No.: 10/190,335

(22) Filed: Jul. 2, 2002

Related U.S. Application Data

(60) Provisional application No. 60/304,725, filed on Jul. 10, 2001.

(51) Int. Cl.$^7$ ................................................ G02B 6/34
(52) U.S. Cl. ............................ 385/37; 385/14; 385/88; 385/92; 385/94; 385/129; 385/130; 385/131; 372/6
(58) Field of Search ................................ 385/37, 3, 16, 385/14, 88, 92, 94, 129, 130, 131; 372/50, 372/97, 20, 45, 6

(56) References Cited

U.S. PATENT DOCUMENTS

| | | | |
|---|---|---|---|
| 6,057,612 A | * | 5/2000 | Temple ........................ 307/150 |
| 6,058,013 A | * | 5/2000 | Christopher et al. ......... 361/704 |
| 6,101,210 A | * | 8/2000 | Bestwick et al. ............. 372/96 |
| 6,480,513 B1 | * | 11/2002 | Kapany et al. ................ 372/20 |
| 2002/0097109 A1 | * | 7/2002 | du Toit et al. ................ 333/26 |
| 2002/0136254 A1 | * | 9/2002 | Yoshida et al. ............... 372/45 |
| 2003/0007535 A1 | * | 1/2003 | Haase et al. .................. 372/50 |
| 2003/0081351 A1 | * | 5/2003 | Parsoneault et al. ..... 360/99.08 |
| 2004/0105480 A1 | * | 6/2004 | Sidorin et al. ................ 372/97 |
| 2004/0165637 A1 | * | 8/2004 | Bullington et al. ........... 372/50 |

* cited by examiner

*Primary Examiner*—Jared J. Fureman
*Assistant Examiner*—Allyson N Trail
(74) *Attorney, Agent, or Firm*—Townsend and Townsend and Crew LLP

(57) ABSTRACT

An ECLD assembly includes a thermally stabilized substrate, a laser device fixedly mounted in relation to the substrate, and a waveguide with a grating region having a grating formed therein. The waveguide is positioned to receive light emitted by the laser device and is attached to a top surface of the substrate. The ECLD's output wavelength is stabilized by one or more of the following: (1) mounting the waveguide so that its outer surface is less than 60 μm, and preferably less than about 30 μm from the top surface of the substrate; (2) placing a thermal cover (e.g., a generally semi-cylindrical shell or a strip of material formed with a V-groove) in thermal contact with the substrate and overlies at least a portion of the grating region; (3) bonding the waveguide to the substrate at first, second, and third positions where the first position is proximate the laser device, the second position is proximate a first end of the grating region, and the third position is proximate a second end of the grating region.

22 Claims, 3 Drawing Sheets

WAVELENGTH STABILIZATION OF AN EXTERNAL CAVITY LASER DIODE (ECLD)

CROSS-REFERENCES TO RELATED APPLICATIONS

This application claims priority from U.S. Patent Application No. 60/304,725, filed Jul. 10, 2001, the entire disclosure of which is incorporated by reference in its entirety for all purposes.

BACKGROUND OF THE INVENTION

The invention relates generally to semiconductor lasers (laser diodes), and more specifically to techniques for stabilizing the wavelength of such lasers in connection with use in fiber optic communications systems.

It is well established that multiple optical communications channels can be optically multiplexed onto a single optical fiber by a technique known as wavelength division multiplexing (WDM). Multiple lasers, each at a different wavelength from the others, are modulated in accordance with respective information patterns, and the modulated light from each laser is output on a respective fiber segment. The light from all the fiber segments is combined onto a single fiber by a wavelength division multiplexer. Light at the other end of the single fiber is separated onto individual fiber segments by a wavelength division demultiplexer, and the light on the individual fiber segments is demodulated to recover the original information patterns.

As the demand for bandwidth has, exploded, due in large part to the growth of the Internet and data communications, additional demands are made on the fiber optic technology. A relatively new technology, called dense wavelength division multiplexing (DWDM), is being deployed to expand the capacity of new and existing optical fiber systems. The improvements include providing more wavelength channels, and where possible, increasing the bit rate on each channel.

As is well known, typical single-mode fiber optics communications are at wavelengths in the 1300-nm and 1550-nm ranges. The International Telecommunications Union (ITU) has defined a standard wavelength grid having a frequency band centered at 193,100 GHz, and other bands spaced at 100 GHz intervals around 193,100 GHz. This corresponds to a wavelength spacing of approximately 0.8 nm around a center wavelength of approximately 1550 nm, it being understood that the grid is uniform in frequency and only approximately uniform in wavelength. Implementations at other grid spacings (e.g., 25 GHz, 50 GHz, 200 GHz, etc.) are also permitted.

A given fiber in a communications system may need to carry as many as 80 closely spaced wavelengths. As the bit rates increase and the wavelength channels become more closely spaced, crosstalk becomes an increasing problem. Thus the need to control the lasers' output wavelengths has become more critical. For example, in a system with the wavelengths spaced at 50 GHz (0.4 nm), each laser's wavelength should be stabilized to a small fraction of the wavelength spacings on the grid. In the example of wavelengths spaced at 50 GHz, this means that an individual laser should be stabilized to within about 2.5 GHz (0.02 nm).

One type of laser source for fiber optic communications systems is what is known as an external cavity laser diode (ECLD). An ECLD includes a laser diode chip in combination with an external waveguide formed with a grating. The grating acts as a filter and limits the output wavelengths to a band that is much narrower than the laser diode's inherent range of wavelengths. A particular type of ECLD uses a fiber Bragg Grating (FBG). It is known that the output wavelength of an ECLD depends on the optical pitch of the grating, which depends on the geometric pitch of the grating and the refractive index of the fiber in the grating region. The geometric pitch and refractive index vary with temperature in accordance with the thermal and material characteristics of the fiber.

Given that laser source modules are typically specified for wide ambient temperature ranges (e.g., −10° C. to +70° C., or even −40° C. to +85° C.), it is known practice to provide a temperature sensing and temperature controlling devices in the module package. A widely used cooling device is a thermoelectric cooler (TEC).

BRIEF SUMMARY OF THE INVENTION

The present invention provides techniques for stabilizing the output wavelength of an ECLD to meet the stringent demands of modern WDM and DWDM communications systems.

In short, it has been recognized that in addition to stabilizing the temperature of the ECLD, it is desirable to reduce any temperature gradients in the device package.

An ECLD assembly according to an aspect of the present invention includes a thermally stabilized substrate, a laser device fixedly mounted in relation to the substrate, and a waveguide with a grating region having a grating formed therein. The waveguide is positioned to receive light emitted by the laser device and is attached to a top surface of the substrate with an outer surface of the waveguide being at a distance of less than 60 $\mu$m, and preferably less than about 30 $\mu$m from the top surface of the substrate. The thermally stabilized substrate typically comprises a substrate body formed of a material having a high thermal conductivity and a thermoelectric cooler in thermal communication with the substrate.

An ECLD assembly according to another aspect of the present invention includes a substrate having a body formed of a material having a high thermal conductivity, a laser device fixedly mounted in relation to the substrate, a waveguide attached to the substrate, the waveguide having a grating region with a grating formed therein. The waveguide is positioned to receive light emitted by the laser device, and a thermal cover is in thermal contact with the substrate and overlies at least a portion of the grating region. The thermal cover is preferably metal or other material having a high thermal conductivity. In some embodiments, the thermal cover is in the form of a generally semi-cylindrical shell; in other embodiments the thermal cover is in the form of a strip of material having a V-groove formed therein and facing the waveguide. The thermal cover is typically bonded to a top surface of the substrate, preferably with a high-thermal-conductivity material such as solder, thermally conductive epoxy, or glass frit.

An ECLD assembly according to another aspect of the present invention includes a substrate, a laser device fixedly mounted in relation to the substrate, and a waveguide having a grating region with a grating formed therein. The waveguide positioned to receive light emitted by the laser device and is bonded to the substrate at each of first, second, and third positions where the first position is proximate the laser device, the second position is proximate a first end of the grating region, and the third position is proximate a second end of the grating region. The bonding is preferably with a high-thermal-conductivity material such as solder, thermally conductive epoxy, or glass frit.

A method of attaching a fiber to a substrate with respect to which a laser device is positioned according to another aspect of the invention includes aligning an end of the fiber to receive light emitted by the laser device, with the fiber so aligned, thermally and mechanically bonding the fiber to the substrate at a first position proximate the laser device, thermally and mechanically bonding the fiber to the substrate at a second position displaced from the first position, and thermally and mechanically bonding the fiber to the substrate at a third position displaced from the first and second positions. The first, second, and third positions are in ascending order of distance from the laser device, with the second and third positions being proximate first and second ends of the fiber's grating region. The fiber may be soldered to metal bond pads located on heating resistors at positions corresponding to the first, second, and third positions.

While any of these aspects of the invention contributes to improving the uniformity over the grating region, embodiments can benefit by combinations of more than one of these aspects. Further enhancements to any of these aspects of the invention may include one or more of the following: placing a metal or other thermally conductive coating on the substrate over at least a region underlying the grating region, placing a metal or other thermally conductive coating on the outer surfaces of the waveguide over at least the grating region, forming metal vias in the substrate to provide additional high thermal conductivity paths between the substrate surface and the interior of the substrate.

A further understanding of the nature and advantages of the present invention may be realized by reference to the remaining portions of the specification and the drawings.

DETAILED DESCRIPTION OF THE INVENTION

Figure 1:
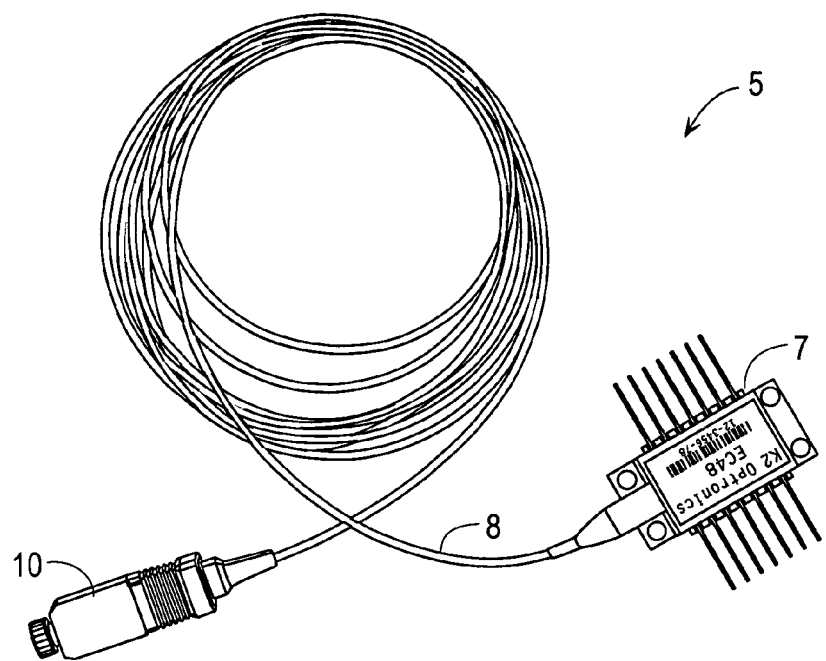
FIG. 1 shows a packaged external cavity laser diode (ECLD) component.

FIG. 1 shows an external cavity laser diode (ECLD) 5 in a representative hermetically sealed package 7 (a 14-pin butterfly package for a specific implementation). In accordance with known practice, the device may be configured with a fiber pigtail 8 that terminates in a desired type of fiber connector 10.

Figure 2:
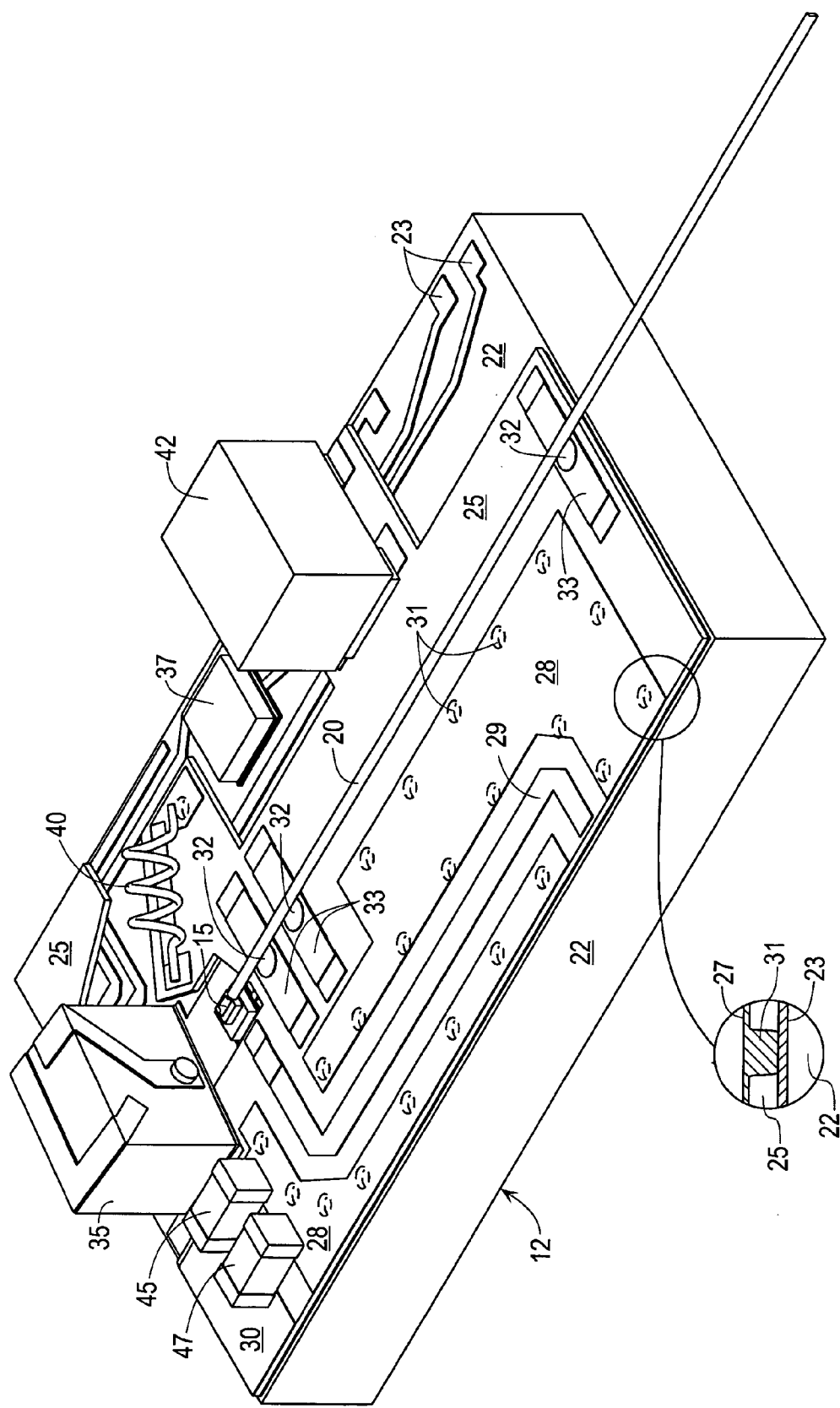
FIG. 2 is shows the substrate with the ECLD.

FIG. 2 shows a substrate 12 on which the ECLD is mounted. The laser system comprises an external-cavity laser diode 15 in combination with an optically coupled fiber grating 20 (sometimes just referred to as the fiber). The laser diode provides a gain medium characterized by a certain band of wavelengths. A portion of the fiber and the grating help define an external resonant cavity.

The grating is formed in the fiber as a series of spaced index perturbations, and limits the wavelengths exiting the external cavity to a second band that is typically much narrower than the first band. For example, the semiconductor optical amplification (SOA) gain spectrum of the laser diode devices is generally characterized by a peak having a typical width (full width at half maximum, or FWHM) on the order of 10–20 nm. The Bragg grating is characterized with a reflection spectrum that has peaks that are significantly narrower than the SOA gain peak, for example, on the order of 0.1–0.2 nm (FWHM). While the gratings in embodiments of the present invention generally comprise equally spaced perturbations, it is also known to have chirped gratings, i.e., gratings where the index perturbations have a spacing that varies along the length of the grating or an average refractive index (effective mode refractive index) that varies along the length of the grating.

The grating is typically defined by a set of plane parallel index perturbations, which may be generated by short-wave (UV) exposure of a pre-sensitized fiber by holographic or phase-mask techniques. Pre-sensitized fiber is typically provided with enhanced doping in the core, with the core made correspondingly smaller in diameter to maintain single-mode operation. Thus, the grating is formed predominantly in the core of the fiber. This technology of forming fiber gratings highly evolved and photosensitive fiber having suitable characteristics is commercially available from such vendors as Lucent and Corning. Thus the fabrication of the grating within the fiber core will not be described in further detail.

To function as an external-cavity laser, the laser diode chip is provided with an anti-reflective (AR) coating on its emitting facet and a highly reflective coating (say 95%) on its opposite facet. In passing it is noted that once the chip has the AR coating, it is no longer capable of operating as a laser without the external cavity. Rather, it is a super luminescent diode.

The fiber grating is primarily responsible for defining the external cavity. Therefore, the laser chip and the fiber grating together define the laser cavity. As mentioned above, the AR coating on the laser chip's emitting facet effectively suppresses the internal cavity of the chip. The effective length of the cavity is the distance between the reflecting (rear) facet and a location approximately half-way along the grating. The grating is preferably on the order of 5–15 mm in length along the optical axis with an overall cavity length on the order of 4–8 mm. In general, the grating bandwidth is inversely proportional to the grating length. For the wavelengths of interest, a grating length of 5 mm results in a grating bandwidth (FWHM) on the order of 0.2 nm. The longitudinal cavity mode spacing is also on this order, and therefore the grating can be designed to limit the output to a single mode. The cavity mode linewidth is on the order of 10–50 MHz (three orders of magnitude narrower than the grating bandwidth). The embodiments and techniques described below, individually or in combination or in various subcombinations can be effective to thermally stabilize the ECLD so that only a single mode is output from the ECLD.

Substrate 12 is a composite structure that includes a substrate body 22 (sometimes referred to as body 22) of material having high thermal conductivity such as beryllium oxide, aluminum nitride, or aluminum oxide (listed in descending order of thermal conductivity). In a particular implementation, body 22 is formed of aluminum nitride. In a specific implementation, substrate 12 has a number of patterned layers deposited on body 22, including a first metal layer 23, a dielectric layer 25, and a second metal layer 27. These layers are deposited using known thick-film processing techniques. The metal layers are preferably gold, but other metals could be used. The dielectric layer is preferably a glass, ceramic, or glass/ceramic material available from vendors such as DuPont Microcircuit Materials.

Dielectric layer 25 covers a significant portion of the substrate area, and second metal layer 27 is patterned on top to include a first set of one or more segments 28, a second segment 29, and a third set of one or more segments 30. Segments 28 are connected by metal vias 31 to the ground layer portion of first metal layer 23. Vias 31 are shown in phantom since they are not visible from the top of the second metal layer. Segment 29 provides an RF transmission line for driving laser diode 15, while segments 30 provide bond pads for electrical components on the substrate. An extended portion of first metal layer 23 serves as a ground plane while other portions provide routing traces for connection to electrical components on the substrate.

Dimensions are generally not part of the invention, but it is noted that the substrate body is a few to several millimeters on a side (e.g., 7×12 mm) and has a thickness in the 0.5–2 mm range. The metal layer thicknesses are in the 0.01–0.03 mm range and the dielectric layer thickness can be on the order of 0.1 mm.

As will be described below, the fiber is attached to the substrate at multiple points along its length to bond pads 32 located on respective heater resistors 33 that are used for electrical resist soldering. Other elements on the substrate include a monitor photodiode 35, a thermistor 37, inductors 40 and 42, and capacitors 45 and 47. These elements are standard and will not be described further except to note that the thermistor is used for monitoring the temperature on the substrate.

Figure 3:
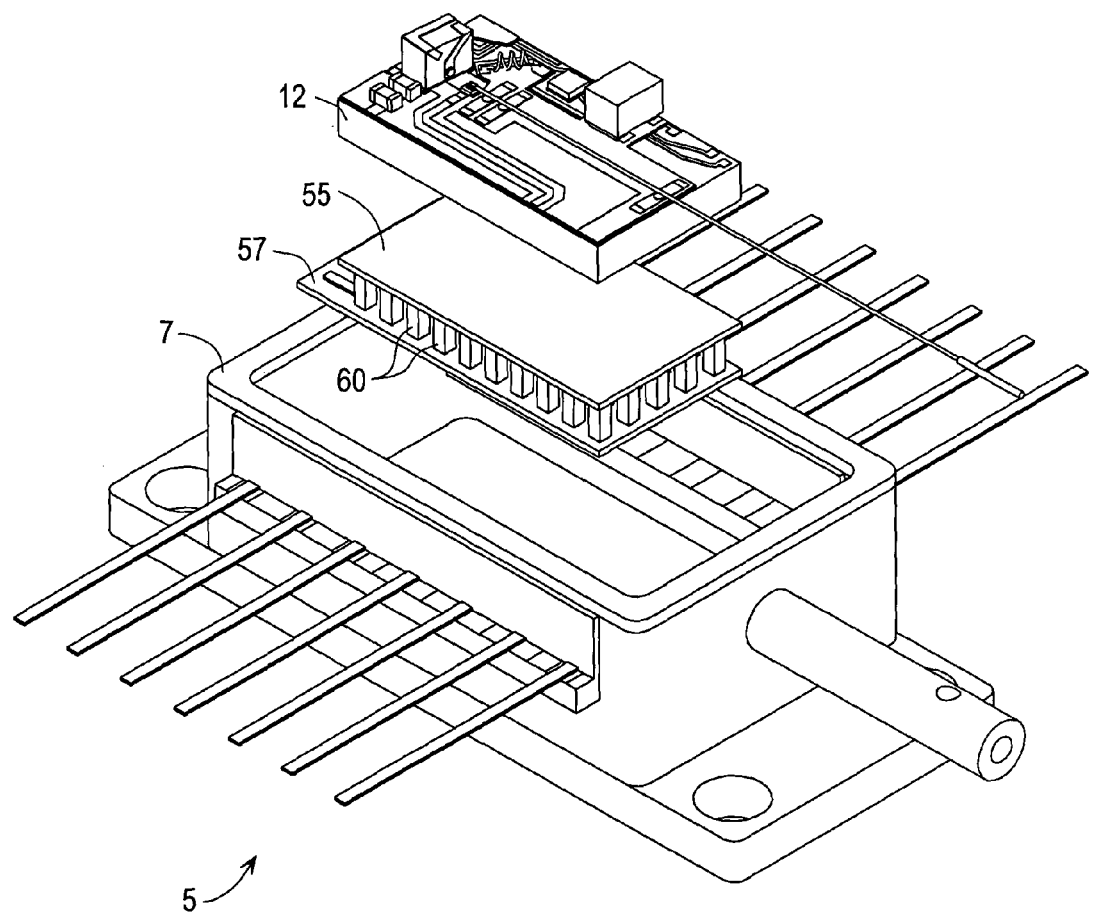
FIG. 3 is an exploded view of the ECLD with the lid removed.

FIG. 3 is an exploded view showing additional elements that are included in the package. Specifically, substrate 12 with the ECLD mounted thereon is in intimate thermal contact with a thermoelectric cooler (TEC) 52, which is formed of upper and lower metal electrodes 55 and 57, between which are disposed a plurality of thermoelectric cooling elements 60. Elements 60 provide a plurality of bi-material junctions.

Figure 4:
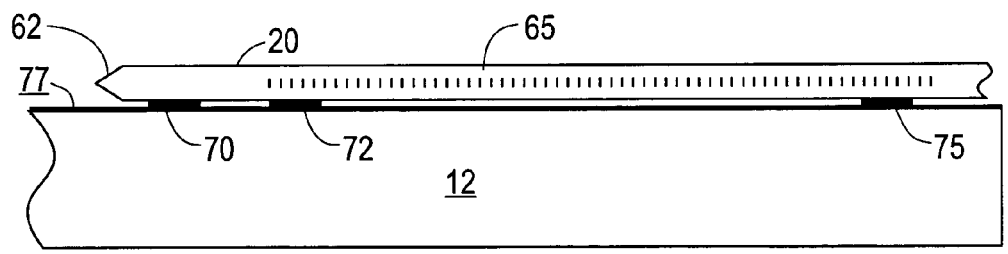
FIG. 4 shows schematically a particular embodiment for fastening the fiber grating to the substrate.

FIG. 4 shows schematically a particular embodiment for fastening fiber grating 20 to substrate 12 (more particularly to bond pads 32). The figure is drawn looking at the fiber from the side and is not to scale. Also shown in this figure are additional details of the fiber grating. In particular, the fiber is formed with a tapered or otherwise lensed end 62, spaced from the laser diode's emitting facet, to increase the efficiency of the optical coupling. This is a known technique, and will not be discussed further. The grating perturbations, denoted 65, are shown schematically as being generally confined to the core portion of the fiber.

The fiber is shown bonded at three locations. A first bond 70 is formed near laser diode 15 during alignment of fiber 20 to the laser diode. A second bond 72 near the end of the grating region closest to the laser diode provides additional thermal coupling to the metallized area and further provides strain relief. A third bond 75 near the end of the grating region farthest from the laser diode provides additional thermal coupling to the substrate and can be used to strain the fiber. These bonds are shown schematically. In a current implementation, the fiber is soldered to a bond pad on a heater resistor, which is bonded to the dielectric layer of the substrate. However, in other embodiments, the fiber can be attached by other techniques than resist soldering, although that is currently preferred. For example, the region under the fiber could be bonded to the substrate where there is no dielectric, for example using a conductive epoxy or glass frit. The substrate could be metallized in that region, denoted schematically as a metallization layer 77. As shown, the first and third bonds are just inside the grating region. It is generally preferred that the bonds be outside the grating region, but for an apodized grating, which is weaker at the ends, bonding at positions within the grating region is unlikely to affect performance.

It is noted that since fiber is not in a ferrule, but rather is bonded directly to the substrate. This allows a very close spacing (say on the order of 20–60 $\mu$m) between the fiber and the substrate. It has been found that at this distance, there is significant heat conductivity between the fiber and the substrate. Thus, the close proximity, by enhancing heat transfer between the fiber and the substrate is effective in increasing the temperature stability of the fiber relative to the other elements, and hence the overall stabilization of the ECLD wavelength.

Figure 5A:
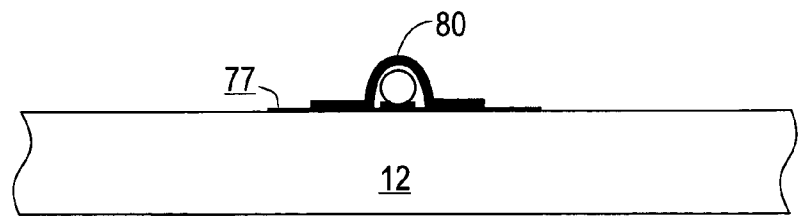
FIGS. 5A and 5B show schematically the use of a thermal cover for enhancing the thermal stabilization of the ECLD wavelength.

FIG. 5A shows schematically one embodiment of a thermal cover 80 for enhancing the thermal stabilization of the ECLD wavelength. The figure is drawn looking along the axis of the fiber and is not to scale. Thermal cover 80 is in the form of a generally semi-cylindrical shell extending over the length of the grating region, with flanges for bonding to the substrate. The thermal cover is preferably made for a close but non-contacting fit to the fiber (say on the order of 20–30 $\mu$m). In this embodiment, the cover is typically made of metal such as copper, aluminum, gold, or silver.

Figure 5B:
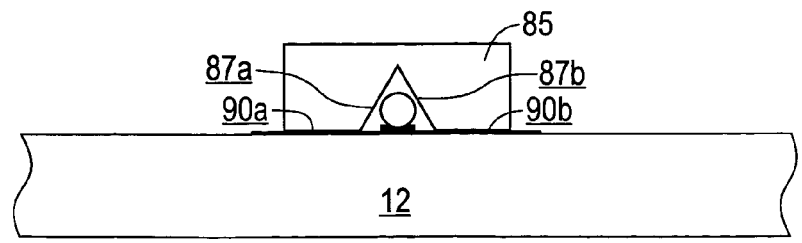

FIG. 5B shows schematically another embodiment of a thermal cover 85 for enhancing the thermal stabilization of the ECLD wavelength. Again, the figure is drawn looking along the axis of the fiber and is not to scale. Thermal cover 85 is in the form of a strip of material formed with a V-groove having sloped surfaces 87a and 87b. The V-groove is flanked by surfaces 90a and 90b, which are shown as bonded to the substrate. Thermal cover 85 is typically made of a ceramic material having high heat conductivity, such as aluminum nitride. Again, the V-groove is dimensioned for a close but non-contacting fit to the fiber.

In some embodiments, the substrate material is chosen to have a negative coefficient of expansion (CTE). This could have the additional benefit of compensating temperature-induced wavelength shifts with countervailing stress-induced wavelength shifts. For example, an increase in temperature would cause the grating's characteristic wavelength to increase for a grating based on germanium-doped silica fiber, but the same increase in temperature would result in compressive stress on the grating (due to contraction of the substrate), which would cause a decrease in the grating's characteristic wavelength.

In conclusion, it can be seen that the present invention, in its various aspects, provides techniques for enhancing the thermal stabilization of an ECLD. As mentioned above, these techniques, alone or in various combinations, contribute to enhanced wavelength stabilization and control.

While the above is a complete description of specific embodiments of the invention, various modifications, alternative constructions, and equivalents may be used. For example, the gap between the fiber and the substrate can be filled with a gel or a soft polymer, preferably having high thermal conductivity. This will create a better heat conduction from the substrate to the fiber, which in turn will stabilize the temperature of the fiber better. However, this gel or polymer will not create significant stress on the fiber.

Therefore, the above description should not be taken as limiting the scope of the invention as defined by the claims.

What is claimed is:

1. An external cavity laser diode (ECLD) assembly comprising:
   a thermally stabilized substrate;
   a laser device fixedly mounted in relation to said substrate;
   an optical fiber; and
   a grating formed within and extending along at least a region of said optical fiber, said region being referred to as the grating region;
   said optical fiber being positioned to receive light emitted by said laser device and being attached to a top surface of said substrate with an outer surface of said optical fiber being at a distance of less than 60 $\mu$m from said top surface of said substrate.

2. The ECLD assembly of claim 1 wherein said top surface of said substrate is metallized over at least a region underlying said grating region.

3. The ECLD assembly of claim 1 wherein said substrate is formed of a material chosen from the group consisting of beryllium oxide, aluminum nitride, aluminum oxide, silicon, and carbon.

4. The ECLD assembly of claim 1 wherein said substrate is formed of a material having a negative coefficient of thermal expansion.

5. The ECLD assembly of claim 1 wherein said thermally stabilized substrate comprises:
   a substrate body formed of a material having a high thermal conductivity; and
   a thermoelectric cooler in thermal communication with said substrate.

6. The ECLD assembly of claim 5 wherein said substrate is formed with metallized vias to aid in conducting heat from said top surface of said substrate to said thermoelectric cooler.

7. An external cavity laser diode (ECLD) assembly comprising:
   a substrate having a body formed of a material having a high thermal conductivity;
   a laser device configured to emit light over a first band of wavelengths, said laser device fixedly mounted in relation to said substrate;
   a waveguide attached to said substrate and positioned to receive light emitted by said laser device;
   a grating formed within and extending along at least a region of said waveguide, said region being referred to as the grating region;
   a thermal cover in thermal contact with said substrate and overlying at least a portion of said grating region; and
   a housing enclosing said substrate, said laser device, said grating region, and said thermal cover.

8. The ECLD assembly of claim 7 wherein said thermal cover is in the form of a generally semi-cylindrical shell.

9. The ECLD assembly of claim 7 wherein said thermal cover is made of a ceramic material.

10. The ECLD assembly of claim 7 wherein said thermal cover is in the form of a strip of material having a V-groove formed therein and facing said waveguide.

11. The ECLD assembly of claim 7 wherein said thermal cover extends over the length of the grating region.

12. The ECLD assembly of claim 7 wherein:
    said substrate has a metallized region extending along said grating region; and
    said thermal cover has flanges that are bonded to said metallized region.

13. The ECLD assembly of claim 7 wherein said thermal cover has an inside surface facing an outside surface of said waveguide, said inside surface of said thermal cover being spaced from said outside surface of said waveguide by a distance on the order of 20–30 $\mu$m.

14. An external cavity laser diode (ECLD) assembly comprising:
    a substrate;
    a laser device fixedly mounted in relation to said substrate;
    a waveguide; and
    a grating formed within and extending along at least a region of said waveguide, said region being referred to as the grating region;
    said waveguide being positioned to receive light emitted by said laser device and being bonded to said substrate at each of a first position proximate said laser device, a second position proximate a first end of said grating region, and a third position proximate a second end of said grating region.

15. The ECLD assembly of claim 14 wherein:
    said substrate is metallized at least in regions surrounding said first, second, and third positions to which said waveguide is bonded; and
    said waveguide is bonded using a high-thermal-conductivity material.

16. The ECLD assembly of claim 14 wherein said high-thermal-conductivity material is one or more materials selected from the group consisting of solder, thermally conductive epoxy, and glass frit.

17. The ECLD assembly of claim 14 wherein said substrate is formed of a material having a negative coefficient of thermal expansion.

18. An external cavity laser diode (ECLD) assembly for insertion into a housing, the ECLD assembly comprising:
    a substrate having a body formed of a material having a high thermal conductivity;
    a laser device configured to emit light over a first band of wavelengths, said laser device fixedly mounted in relation to said substrate;
    an optical fiber attached to said substrate and positioned to receive light emitted by said laser device;
    a grating formed along at least a region of said fiber, said region being referred to as the grating region; and
    a thermal cover in thermal contact with said substrate and overlying at least a portion of said grating region, said thermal cover distinct from the housing and further being for insertion into the housing as part of the ECLD assembly.

19. The ECLD assembly of claim 18 wherein said thermal cover is in the form of a generally semi-cylindrical shell.

20. The ECLD assembly of claim 18 wherein said thermal cover is in the form of a strip of material having a V-groove formed therein and facing said waveguide.

21. An external cavity laser diode (ECLD) assembly comprising:
    a substrate;
    a laser device fixedly mounted in relation to said substrate;
    an optical fiber; and
    a grating formed along at least a region of said fiber, said region being referred to as the grating region;
    said fiber being positioned to receive light emitted by said laser device and being bonded to said substrate at each of a first position proximate said laser device, a second position proximate a first end of said grating region, and a third position proximate a second end of said grating region.

22. The ECLD of claim 21 wherein:
    said substrate is metallized at least in regions surrounding said first, second, and third positions to which said waveguide is bonded; and
    said waveguide is bonded using a high-thermal-conductivity material.

* * * * *